US012688134B2

(12) United States Patent
Lee et al.

(10) Patent No.: US 12,688,134 B2
(45) Date of Patent: Jul. 21, 2026

(54) INTERFACE FUNCTIONAL BLOCK AND DESIGN METHOD THEREOF

(71) Applicant: SAMSUNG ELECTRONICS CO., LTD., Suwon-si (KR)

(72) Inventors: Beomwoo Lee, Suwon si (KR); Donghyon Kang, Suwon si (KR); Mikyung Kim, Suwon si (KR); Cheonsu Lee, Suwon si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 18/741,864

(22) Filed: Jun. 13, 2024

(65) Prior Publication Data

US 2025/0013587 A1      Jan. 9, 2025

(30) Foreign Application Priority Data

Jul. 6, 2023    (KR) ........................ 10-2023-0087985

(51) Int. Cl.
| | |
|---|---|
| *G06F 13/20* | (2006.01) |
| *G06F 1/06* | (2006.01) |
| *G06F 13/14* | (2006.01) |
| *G06F 13/38* | (2006.01) |
| *G06F 13/42* | (2006.01) |

(52) U.S. Cl.
CPC ................ *G06F 13/20* (2013.01); *G06F 1/06* (2013.01)

(58) Field of Classification Search
CPC .............................. G11C 7/225; G11C 7/1057
See application file for complete search history.

(56) References Cited

U.S. PATENT DOCUMENTS

| | | | |
|---|---|---|---|
| 7,814,359 B2 | 10/2010 | Bae et al. | |
| 7,821,288 B1 | 10/2010 | Lo et al. | |
| 7,864,621 B2 | 1/2011 | Ashizawa | |
| 7,945,805 B2 | 5/2011 | Baumgartner et al. | |
| 10,586,970 B2 | 3/2020 | Sugiyama et al. | |
| 11,615,849 B2 * | 3/2023 | Li ......................... | G11C 16/08 |
| | | | 365/185.22 |

(Continued)

FOREIGN PATENT DOCUMENTS

| | | |
|---|---|---|
| JP | H06325126 | 11/1994 |
| JP | 3465885 | 11/2003 |

(Continued)

*Primary Examiner* — Getente A Yimer

(74) *Attorney, Agent, or Firm* — Morgan, Lewis & Bockius LLP

(57) ABSTRACT

An interface functional block includes first and second data I/O circuits arranged sequentially along a first axis, a strobe signal I/O circuit disposed at a left side of the first axis from the first data I/O circuit, a clock generator circuit disposed at a right side of the first axis from the second data I/O circuit, first and second type routing cells arranged sequentially along a second axis perpendicular to the first axis at a first axis coordinate of the strobe signal I/O circuit, third and fourth type cells arranged sequentially along the second axis at a first axis coordinate of the first and second data I/O circuits, and further third and fourth type routing cells sequentially arranged. A clock generated by the clock generator circuit is transferred in a left direction of the first axis toward the first and second data I/O circuits and the strobe signal I/O circuit.

20 Claims, 20 Drawing Sheets

(56) References Cited

U.S. PATENT DOCUMENTS

| | | | | |
|---|---|---|---|---|
| 11,657,858 | B2* | 5/2023 | Kim ....................... | G11C 5/025 |
| | | | | 365/185.12 |
| 12,395,157 | B2* | 8/2025 | Wang ................ | H10D 30/6219 |
| 2006/0030138 | A1 | 2/2006 | Konishi | |
| 2008/0137472 | A1* | 6/2008 | Schnell .................. | G11C 7/225 |
| | | | | 365/233.11 |
| 2019/0259460 | A1* | 8/2019 | Noro .................... | G11C 7/1057 |

FOREIGN PATENT DOCUMENTS

| | | |
|---|---|---|
| JP | 3647686 | 5/2005 |
| JP | 2010287807 | 12/2010 |
| KR | 10-0661310 | 12/2006 |
| KR | 10-0870536 | 11/2008 |
| KR | 10-1129147 | 3/2012 |

* cited by examiner

FIG. 2

CLK_GEN module

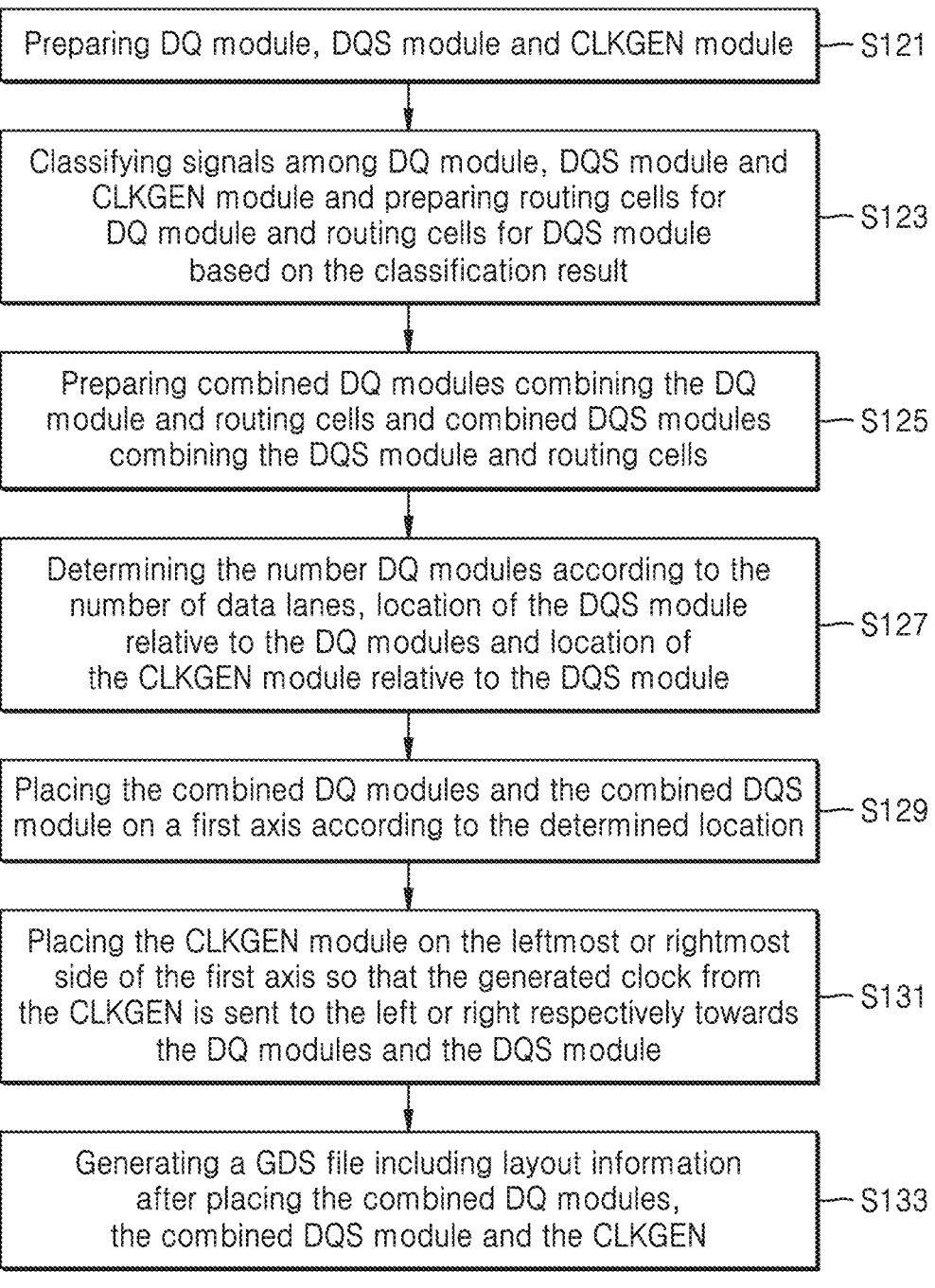

Preparing DQ module, DQS module and CLKGEN module — S121

Classifying signals among DQ module, DQS module and CLKGEN module and preparing routing cells for DQ module and routing cells for DQS module based on the classification result — S123

Preparing combined DQ modules combining the DQ module and routing cells and combined DQS modules combining the DQS module and routing cells — S125

Determining the number DQ modules according to the number of data lanes, location of the DQS module relative to the DQ modules and location of the CLKGEN module relative to the DQS module — S127

Placing the combined DQ modules and the combined DQS module on a first axis according to the determined location — S129

Placing the CLKGEN module on the leftmost or rightmost side of the first axis so that the generated clock from the CLKGEN is sent to the left or right respectively towards the DQ modules and the DQS module — S131

Generating a GDS file including layout information after placing the combined DQ modules, the combined DQS module and the CLKGEN — S133

INTERFACE FUNCTIONAL BLOCK AND DESIGN METHOD THEREOF

CROSS-REFERENCE TO RELATED APPLICATION

This application is based on and claims priority under 35 U.S.C. § 119 to Korean Patent Application No. 10-2023-0087985, filed on Jul. 6, 2023, in the Korean Intellectual Property Office, the disclosure of which is incorporated by reference herein in its entirety.

TECHNICAL FIELD

This disclosure relates generally to an interface functional block and a design method thereof, and more particularly, to a high-speed serializer/deserializer (SERDES) interface and a design method thereof.

DISCUSSION OF RELATED ART

Recently, as data transfer speeds of semiconductor devices have increased, the amount of data transferred per unit time has rapidly increased. Particularly, in cellular communication products, a data transfer speed between a radio frequency (RF) transceiver and a modem (baseband) is on the order of ten Gbps (gigabits per second). Because an RF transceiver and a modem are mounted on a printed circuit board (PCB) having a limited area in a cellular product, the use of parallel interfaces where the amount of data transfer increases by physically increasing the number of transfer lines, reaches a limit. To overcome this limitation, serial interfaces using serializer/deserializer (SERDES) technology for increasing the amount of data transfer while maintaining the number of transfer lines, are being applied to products. A SERDES transmitter may serialize data transferred in parallel over a data link and transfer data through a transfer line by using a dual data rate (DDR) protocol. A SERDES receiver receives data serially transferred by the transmitter according to the DDR protocol, deserializes the received data, and transfers deserialized data over a link.

Different products having a high-speed interface may have different respective needs for data transfer speed (i.e., bandwidth). Conventionally, it is necessary to individually design an interface functional block according to the data bandwidth needed for each product. The need for individual design procedures makes it difficult to reduce the time to develop the products.

SUMMARY

Embodiments of the inventive concept provide an optimal interface functional block, which supports various data bandwidths by using routing cells where routing lines are previously patterned, and a design method of the optimal interface functional block.

According to an aspect of the inventive concept, there is provided an interface functional block including a first data input/output (I/O) circuit and a second data I/O circuit arranged sequentially along a first axis, a strobe signal I/O circuit disposed at a left of the first axis from the first data I/O circuit, a clock generator circuit disposed at a right of the first axis from the second data I/O circuit, a first type routing cell and a second type routing cell arranged sequentially along a second axis perpendicular to the first axis at a first axis coordinate of the strobe signal I/O circuit, a third type routing cell and a fourth type routing cell, which are arranged sequentially along the second axis at a first axis coordinate of the first data I/O circuit, a further third type routing cell and a further fourth type routing cell, which are arranged sequentially along the second axis at a first axis coordinate of the second data I/O circuit, wherein a clock generated by the clock generator circuit is transferred in a left direction of the first axis toward the first and second data I/O circuits and the strobe signal I/O circuit.

According to another aspect of the inventive concept, there is provided an interface functional block including a first data input/output (I/O) circuit and a second data I/O circuit arranged sequentially along a first axis, a strobe signal I/O circuit disposed at a right of the first axis from the second data I/O circuit, a clock generator circuit disposed at a left of the first axis from the first data I/O circuit, a first type routing cell and a second type routing cell arranged sequentially along a second axis perpendicular to the first axis at a first axis coordinate of the strobe signal I/O circuit, a third type routing cell and a fourth type routing cell arranged sequentially along the second axis at a first axis coordinate of the first data I/O circuit, a further third type routing cell and a further fourth type routing cell, which are arranged sequentially along the second axis at a first axis coordinate of the second data I/O circuit, wherein a clock generated by the clock generator circuit is transferred in a right direction of the first axis toward the first and second data I/O circuits and the strobe signal I/O circuit.

According to another aspect of the inventive concept, there is provided a design method of an interface functional block, the design method including generating routing cells for a data input/output (I/O) circuit based on arrangement positions of the data I/O circuit and the strobe signal I/O circuit and routing cells for the strobe signal I/O circuit based on arrangement positions of the strobe signal I/O circuit and the clock generator circuit, based on a classification result of signal lines between the data I/O circuit, the strobe signal I/O circuit, and the clock generator circuit, generating combined data I/O circuits where the data I/O circuit is combined with the routing cells for the data I/O circuit and combined strobe signal I/O circuits where the strobe signal I/O circuit is combined with the routing cells for the strobe signal I/O circuit, placing two or more of the combined data I/O circuits and two or more of the combined strobe signal I/O circuits along a first axis, and placing the clock generator circuit along the first axis so that a clock generated by the clock generator circuit is transferred in a left or right direction of the first axis toward the combined data I/O circuits and the combined strobe signal I/O circuits.

BRIEF DESCRIPTION OF THE DRAWINGS

Embodiments will be more clearly understood from the following detailed description taken in conjunction with the accompanying drawings in which:

FIG. 2 is a block diagram illustrating an example configuration of a data input/output (I/O) module illustrated in FIG. 1;

FIG. 5 is a diagram illustrating example configurations of routing cells illustrated in FIG. 1;

FIG. 12 is a design flowchart of an interface functional block, according to an embodiment.

DETAILED DESCRIPTION OF EMBODIMENTS

Hereinafter, embodiments will be described in detail with reference to the accompanying drawings.

Figure 1:
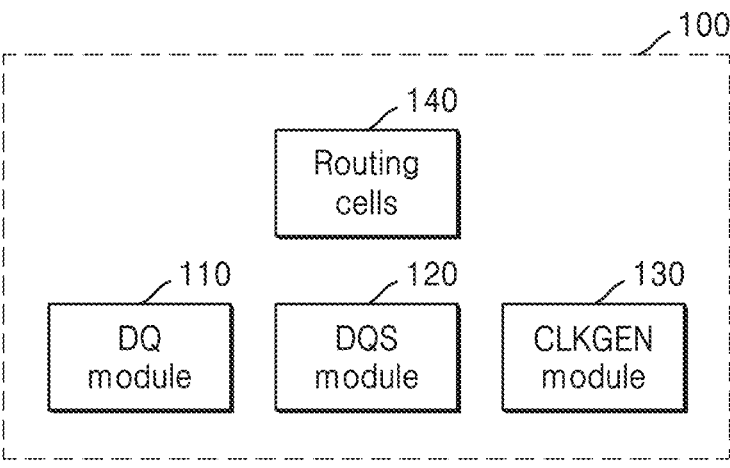
FIG. 1 illustrates modules constituting an interface functional block according to an embodiment.

FIG. 1 illustrates circuits ("modules") configuring an interface circuit block 100 (hereinafter referred to as an interface functional block 100) according to an embodiment. The interface functional block 100 may include a data input/output (I/O) circuit 110 (hereinafter referred to as a DQ module), a strobe signal I/O circuit 120 (hereinafter referred to as a DQS module), a clock generator circuit 130 (hereinafter referred to as a CLKGEN module), and routing cells 140 including passive circuit elements. For example, the interface functional block 100 may be a functional block which transfers or receives data between a transmitter and a receiver by using source synchronous clocking, based on a dual data rate (DDR) standard in an example embodiment. In other embodiments, the interface functional block 100 may denote an interface functional block which serially transfers or receives data in synchronization with a transfer reference clock. Although one DQ module 110 is shown in FIG. 1, the interface functional block 100 may include a plurality of DQ modules 110.

Here, a module may correspond to a functional circuit which is pre-designed for a predetermined function and is registered in a database of a computer. DQ module 110 may be a circuit which performs a function of transferring data to the exterior and receiving data from an external source. DQS module 120 may be a circuit which performs a function of transferring a data strobe signal DQS to the exterior and receiving the data strobe signal DQS from an external source. A CLKGEN module may be a circuit which performs a function of providing a clock for processing data transferred or received by the DQ module and providing a clock for transferring or receiving the DQS signal using the DQS module.

Also, a routing cell may be a basic passive unit where metal wirings for transferring an input signal to an output are pre-patterned (the routing cell may not perform a predetermined logic function). The routing cell may include a buffer circuit along with the metal wirings, based on an input or transfer direction of a signal. Also, the interface functional block 100 may be an element which is included in a physical layer and may include hardware circuits including one or more transmitters and receivers.

Designs for the modules 110, 120, and 130 and the routing cell 140 each configuring the interface functional block 100 may be included in a computer database which includes standard cells such as an AND gate or an OR gate and library cells. The number of DQ modules may be determined based on a data bandwidth desired by the interface functional block 100, and based thereon, a plurality of DQ modules 110, the DQS module 120, and the CLKGEN module 130 may be disposed and routing cells 140 connecting signals with one another therebetween, thereby configuring the interface functional block 100.

Figure 2:
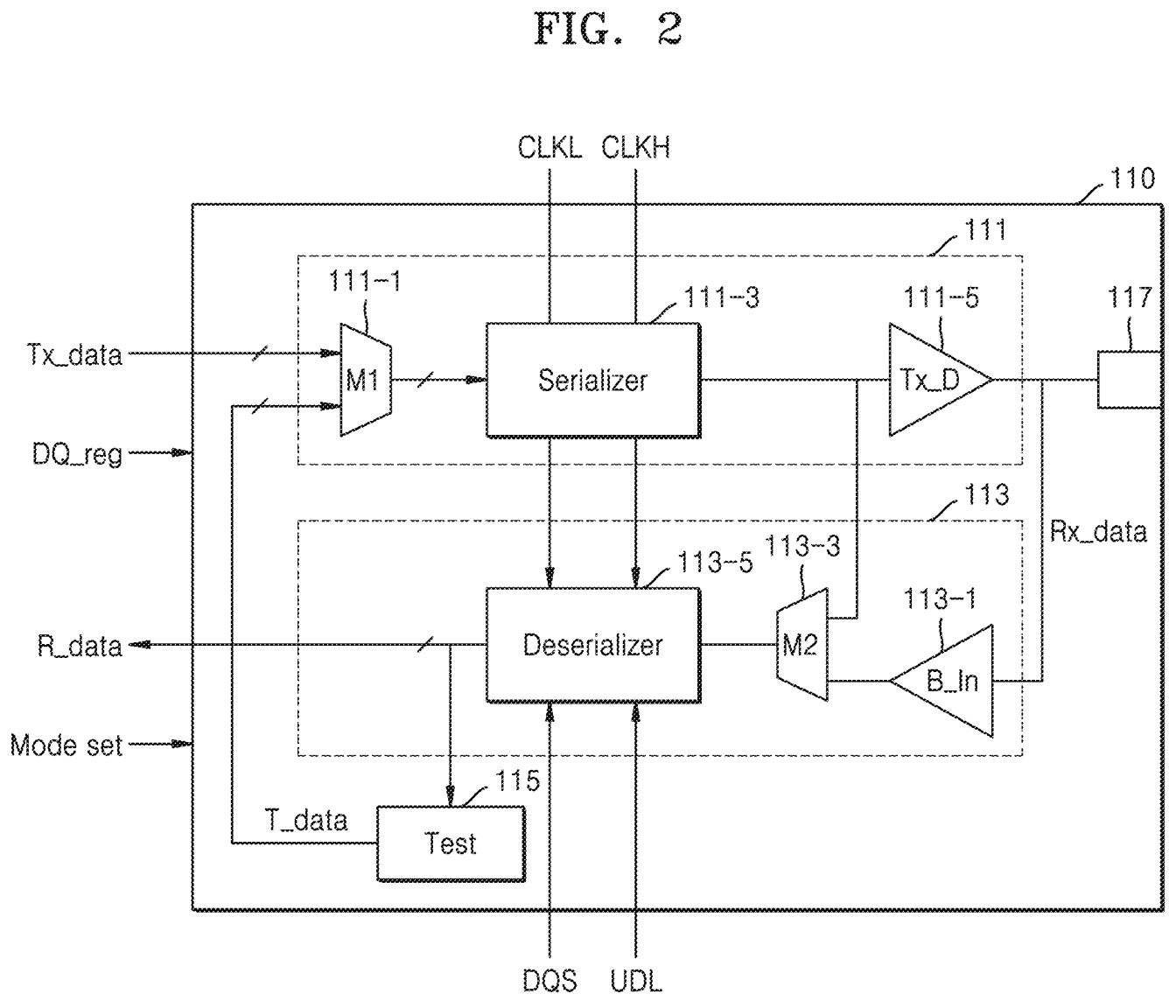
Figure 3:
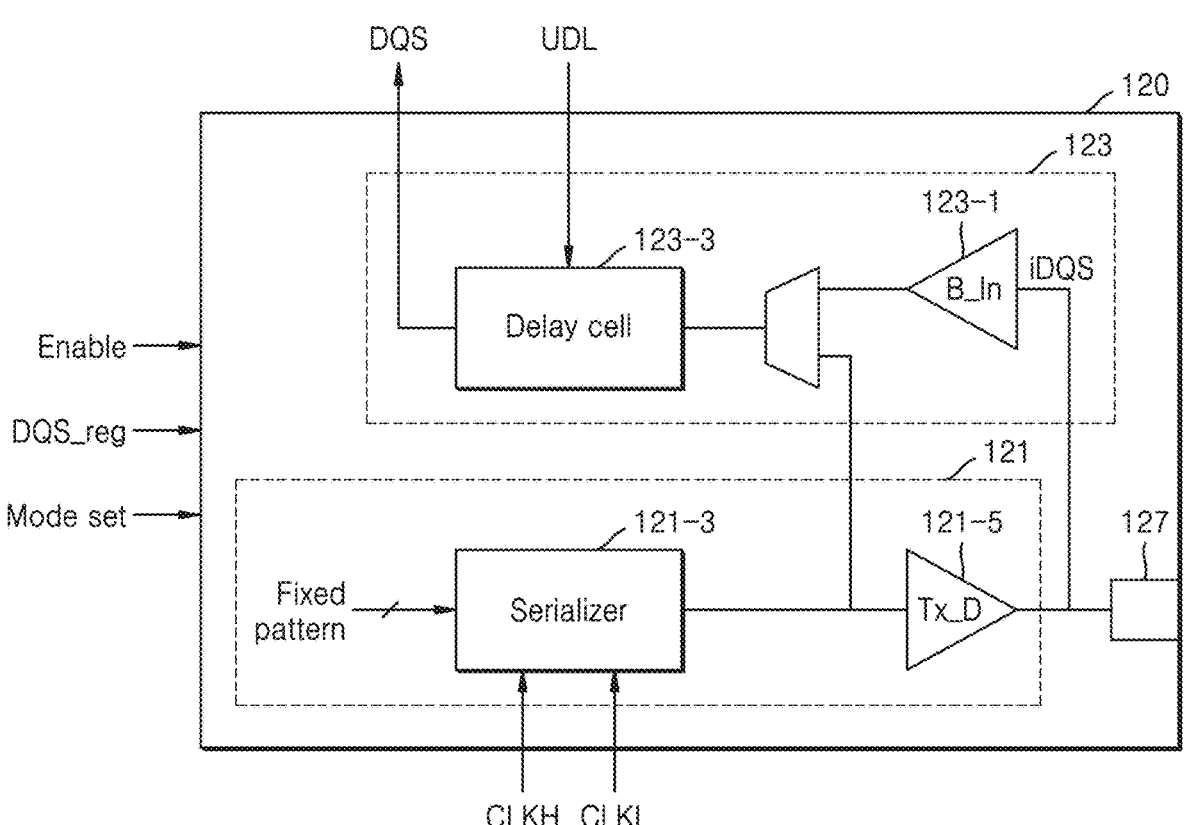
FIG. 3 is a block diagram illustrating an example configuration of a strobe signal I/O module illustrated in FIG. 1.
Figure 4:
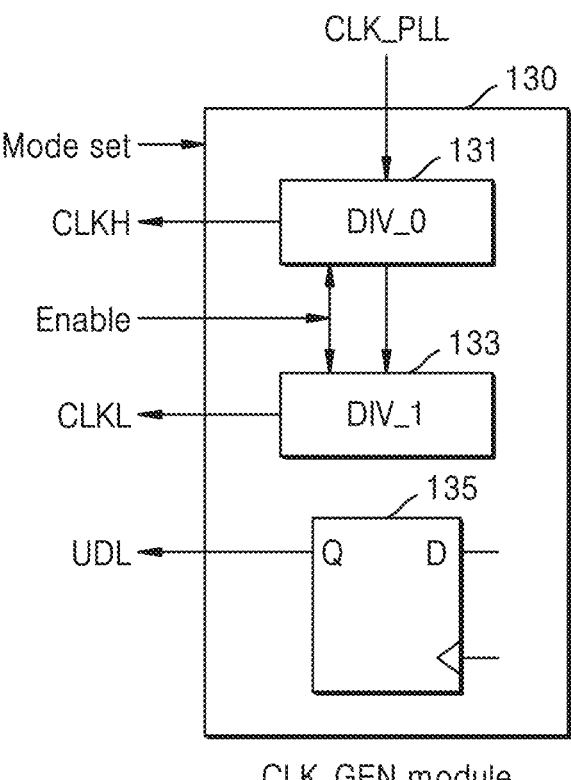
FIG. 4 is a block diagram illustrating an example configuration of a clock generator module illustrated in FIG. 1.

FIG. 2 illustrates the DQ module 110 of FIG. 1 and an I/O signal thereof, according to an embodiment. FIG. 3 illustrates the DQS module 120 of FIG. 1 and an I/O signal thereof, according to an embodiment. FIG. 4 illustrates the CLKGEN module 130 of FIG. 1 and an I/O signal thereof, according to an embodiment.

First, referring to FIG. 2, the DQ module 110 may include a transmitter 111, a receiver 113, and a test unit 115. The transmitter 111 may include a multiplexer (M1) 111-1 which selects output data Tx_data and test data T_data each input in parallel over a data link, a serializer 111-3 which serializes an output of the multiplexer (M1) 111-1 using a first clock CLKL and a second clock CLKH, and a driver (Tx_D) 111-5 which transfers serialized data. The serializer 111-3 may include a plurality of flip-flops. For example, the serializer 111-3 may include flip-flops which sort 16-bit parallel data Tx_data, transferred by the multiplexer (M1) 111-1, as two pieces of 8-bit parallel data, based on the first clock CLKL. In a transfer mode, the serializer 111-3 may serialize the sorted 8-bit parallel data at a dual data rate (DDR) on the basis of a rising edge and a falling edge of the second clock CLKH and may transfer serialized data to the driver (Tx_D) 111-5. A frequency of the second clock CLKH may be a data transfer frequency and may be four or more times higher than a frequency of the first clock CLKL. The driver 111-5 may output data, transferred through the serializer 111-3, to an external receiver (not shown).

The receiver 113 may include an input buffer (B_In) 113-1 which receives input data Rx_data serially input at a port 117 from an external circuit (e.g., a logic/processing circuit), a multiplexer (M2) 113-2 which selects between the input data Rx_data and test data T_data transferred through the serializer 111-3, based on a mode, and a deserializer 113-5 which delays, by a delay value, data output from the multiplexer (M2) 113-2, samples delayed input data by using the second clock CLKH with respect to a data strobe signal DQS transferred from the DQS module 120, deserializes sampled input data by using the first clock CLKL, and outputs deserialized input data to the data link. The deserializer 113-5 may set the delay value through a data training (DQ training) operation and may receive a change reference signal UDL, which determines a timing for changing an operation using the set delay value, from the CLKGEN module 130.

The test unit 115 may check whether each of the transmitter 111 and the receiver 113 included within the DQ module 110 normally performs a predetermined function. The test unit 115 may generate a random test pattern T_data in response to a mode setting Mode_set representing a test mode operation and may transfer the generated test pattern to the transmitter 111. The test pattern T_data transferred to the multiplexer 111-1 of the transmitter 111 may be transferred to the deserializer 113-5 via the serializer 111-3 and the multiplexer 113-3, and a test pattern passing through the deserializer 113-5 may be input to the test unit 115. In a test mode, the test unit 115 may compare the generated test pattern with the input test pattern to verify an expected operation of each of the transmitter 111 and the receiver 113.

The interface functional block 100 may include a plurality of DQ modules 110, and each of the DQ modules 110 may receive output data Tx_data which may be a dedicated signal transferred to only a corresponding DQ module and a signal DQ_reg which sets driver Tx_D strength. The DQ module 110 may output input data R_data which is a dedicated signal output from only a corresponding DQ module 110. The DQ module 110 may receive a mode selection signal Mode_set representing a transfer/reception mode or the test mode.

Referring to FIG. 3, the DQS module 120 may include a transmitter 121 and a receiver 123. The transmitter 121 may include a serializer 121_3 and a driver (Tx_D) 121-5, as in the implementation of the transmitter 111 of the DQ module 110. The transmitter 121 may have the same configuration as that of the transmitter 111 of the DQ module 110 except for receiving a fixed pattern (for example, a pattern where 0101 is repeated), so as to generate the data strobe signal DQS which is an output and is a clock type. The receiver 123 may include an input buffer (B_in) 123-1 which receives a data strobe signal iDQS input at a port 127 from an external circuit (e.g., a logic or processing circuit) and a delay cell 123-3 which delays a received iDQS signal and outputs a delayed DQS signal. The delayed DQS signal may be transferred to the receiver 113 of the DQ module 110. The receiver 123 may set a delay value through a training operation of controlling the delay of the input DQS signal and may receive the change reference signal UDL, which is a timing signal for changing an operation by using the set delay value, from the CLKGEN module 130 as in the DQ module 110.

When at least one of a plurality of DQ modules within the interface functional block 100 is enabled, the DQS module 120 is enabled together, and thus, may receive an operation enable signal Enable. The DQS module 120 may receive the setting signal DQS_reg, which sets driver strength, as a dedicated signal. The DQS module 120 may receive the mode selection signal Mode_set representing the transfer/reception mode or the test mode. Also, the DQS module 120 may operate based on a differential signal scheme which transfers or receives the data strobe signal and an inverted data strobe signal together.

Referring to FIG. 4, the CLKGEN module 130 may include frequency dividers 131 and 133 and a "change reference" signal generator 135. The CLKGEN module 130 may include a first frequency divider (DIV0) 131 which receives and divides a clock CLK_PLL generated by a phase lock loop or a delayed lock loop (DLL) to generate the second clock CLKH and a second divider (DIV1) 133 which frequency divides the second clock CLKH to generate the first clock CLKL. For example, the first divider (DIV0) 131 may divide the clock CLK_PLL frequency by 2 to generate the second clock CLKH, and the second divider (DIV1) 133 may divide the second clock CLKH by 8 to generate the first clock CLKL. Alternatively, the second divider (DIV1) 133 may directly divide the clock CLK_PLL instead of dividing the second clock CLKH to generate the first clock CLKL. The change reference signal generator 135 may simultaneously reflect a setting value set in each of the DQ module 110 and the DQS module 120 to generate the change reference signal UDL which is input to enable an operation, in synchronization with the first clock CLKL, and may transfer the change reference signal UDL to the DQ module 110 and the DQS module 120. For example, the setting value may be a delay value which is set in each of the deserializer 113-5 of the DQ module 110 and the delay cell 123-3 of the receiver 121 of the DQS module 120.

The CLKGEN module 130 may receive the mode selection signal Mode_set representing the transfer/reception mode or the test mode. When at least one of the plurality of DQ modules within the interface functional block 100 is enabled, the CLKGEN module 130 is enabled together, and thus, may receive the operation enable signal Enable.

Referring again to FIGS. 2 to 4, signals input or output to or from the DQ module 110, the DQS module 120, and the CLKGEN module 130 each configuring the interface functional block 100 may be classified into the dedicated signals Tx_data, Rx_data, and DQ_reg of the DQ module 110, the dedicated signal DQS_reg of the DQS module 120, the mode selection signal Mode_set which is a first common signal C1 input to all of the modules 110, 120, and 130 in common, the operation enable signal Enable which is a second common signal C2 input to the DQS module 120 and the CLKGEN module 130 in common, and the change reference signal DUL which is a third common signal C3 transferred from the CLKGEN module 130 to the DQ module 110 and the DQS module 120.

A data bandwidth needed for each product may be determined, and thus, the interface functional block 100 may include two or more DQ modules 110, the DQS module 120, and the CLKGEN module 130 and may further include the routing cells 140 for connecting the dedicated signals, the first common signal C1, the second common signal C2, and the third common signal C3 with one another.

Figure 5:
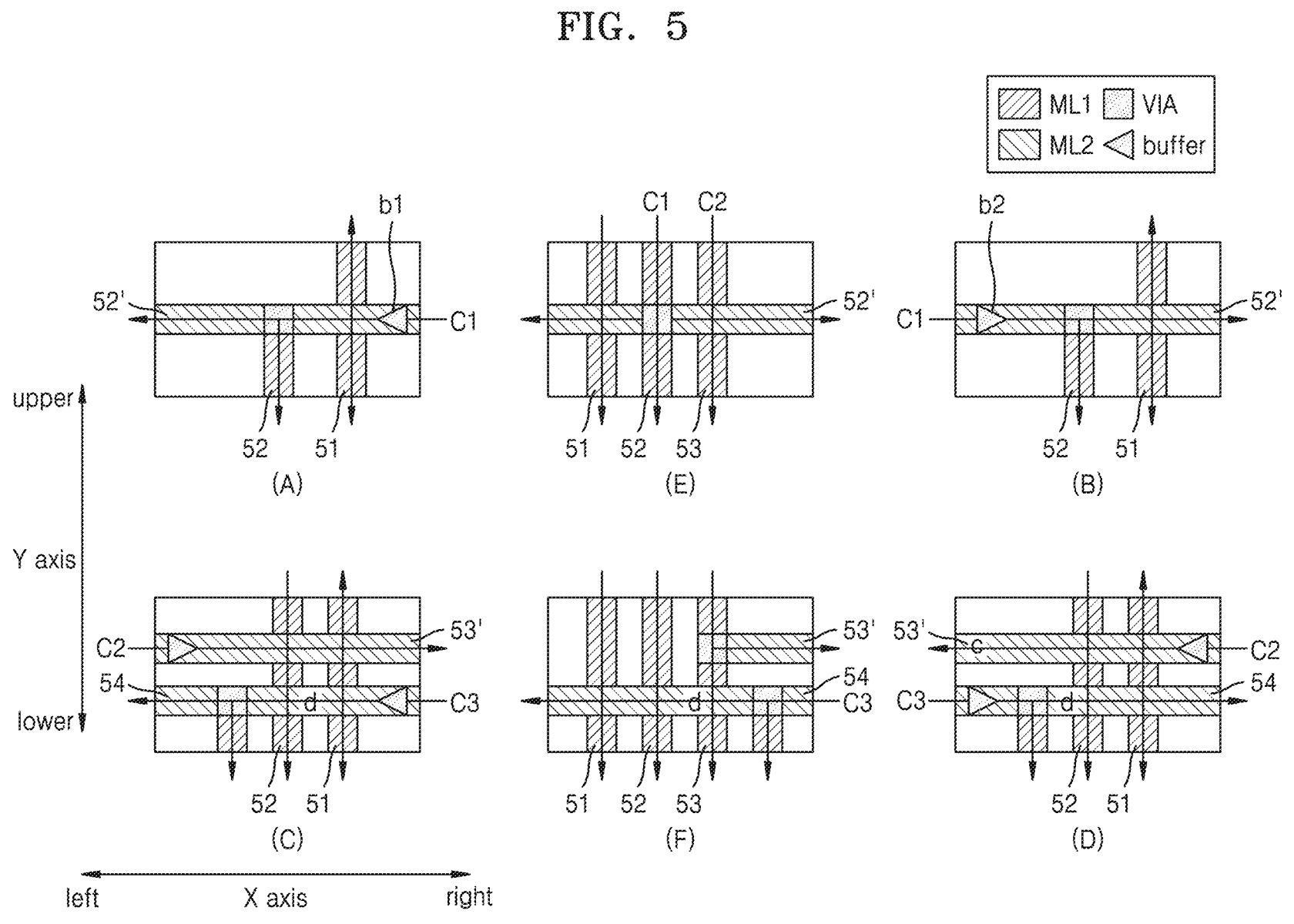

FIG. 5 illustrates various types of routing cells for a routing cell according to an embodiment. According to embodiments, a plurality of routing cells including routing lines arranged as different types may be defined, and at least some of the defined plurality of routing cells may be selected and may be disposed in the interface functional block 100, in association with the transfer of various signals between the DQ module 110, the DQS module 120, and the CLKGEN module 130. In FIG. 5 as well as in FIGS. 6A to 10B discussed later, routing cells 140 and modules 110, 120 and 130 are illustrated and described in the context of an XYZ cartesian coordinate system (the Z direction into/out of the paper), with relative terms left and right denoting relative locations (coordinates) of elements or signal directions along the X axis and "upper" and "lower" denoting relative locations of elements or relative signal directions along the Y axis. Metal lines located at different Z direction coordinates may be connected by a via (VIA).

Referring to FIG. 5, a plurality of routing cells having different types (or "routing patterns") may be defined or classified based on positions, at which the DQS module 120 and the CLKGEN module 130 are disposed with respect to the DQS module 120 included in the interface functional block 100, and signals transferred or received to or from the DQ module 110, the DQS module 120, and the CLKGEN module 130, and in FIG. 5, six routing cells A to F are illustrated as examples. However, embodiments are not limited thereto, and a different number of routing cells may be defined based on various different types where the interface functional block 100 is implementable, or another routing pattern in addition to the routing pattern illustrated in FIG. 5 may be defined. For example, in the embodiments, data, a data strobe signal, and a clock are described, but in a case where various types of signals are transferred to the interface functional block 100, routing lines may be further provided based thereon. For example, in the embodiments, two clocks are described, but N number of clock signals may be defined in association with the transfer or reception of data, and routing lines may be implemented in a routing cell to correspond thereto.

In an embodiment, each routing cell may include routing lines which are formed in at least two metal routing layers ML1 and ML2, and routing lines of different metal routing layers ML1 and ML2 may be connected with each other through a via VIA. A routing cell of each type may include a buffer which determines a transfer direction of a signal transferred to a routing line.

In FIG. 5, each routing line is illustrated as a single routing line for convenience of description, but one "routing line" may actually be configured as a plurality of routing lines, based on the type of a transferred signal. In FIG. 5, an arrow illustrated on a routing line represents a transfer direction of a signal transferred to that routing line.

Routing cells may include four types of routing cells A to D (each an example of a "third type" or "fourth type" routing cell) for the DQ module 110 and two types of routing cells E and F (each an example of a "first type routing cell" or "second type routing cell") for the DQS module 120.

The routing cell E may receive a dedicated signal for the DQS module 120, the first common signal C1, and the second common signal C2. The routing cells A and B may receive the dedicated signal for the DQ module 110 and may receive the first common signal C1 from the routing cell E. The routing cell F may receive, from the routing cell E, the signal for the DQS module 120, the first common signal C1, the second common signal C2, and a third common signal C3 transferred from the CLKGEN module 130, transfer the received signals to the DQS module 120, and transfer the second common signal C2 and the third common signal C3 to the routing cell C or the routing cell D.

The routing cell C and the routing cell D may receive the dedicated signal for the DQ module 110 and the first common signal C1 from the routing cell A or the routing cell B, transfer the received signals to the DQ module 110, and receive the third common signal C3 from the routing cell F.

Each of the routing cells A to F may include a routing line 51 extending along a Y axis for a dedicated signal and a routing line 52 extending along the Y axis for the first common signal C1. Transfer data Tx_data, reception data R_data, and module setting signals DQ_reg and DQS_reg, which are dedicated signals for the DQ module 110 or the DQD module 120, may be transferred to the routing line 51, and thus, an arrow may be illustrated in both directions. Each of the routing cells A, B, and E may further include a routing line 52' which is connected with the routing line 52 and extends along an X axis. Each of the routing cells E and F may further a routing line 53 which extends along the Y axis for the second common signal C2. Each of the routing cells F, C, and D may further include a routing line 53' which is connected with the routing line 53 for the second common signal C2 and extends along the X axis. Each of the routing cells F, C, and D may further include a routing line 54 which extends along the X axis for the third common signal C3 transferred from the CLKGEN module 130.

In the routing cell A and the routing cell B, drive directions of buffers b1 and b2 may differ based on a transfer direction of the first common signal C1. The routing cell A may include a buffer which receives the first common signal C1 at the right of the X axis and drives the first common signal C1 to the left of the X axis. The routing cell B may include a buffer which receives the first common signal C1 at the left of the X axis and drives the first common signal C1 to the right of the X axis.

In the routing cell C and the routing cell D, drive directions of buffers may differ based on a transfer direction of the second common signal C2 or the third common signal C3. The routing cell C may include a buffer which receives the second common signal C2 at the left of the X axis and drives the second common signal C2 to the right of the X axis and a buffer which receives the third common signal C3 at the right of the X axis and drives the third common signal C3 to the left of the X axis. The routing cell D may include a buffer which receives the second common signal C2 at the right of the X axis and drives the second common signal C2 to the left of the X axis and a buffer which receives the third common signal C3 at the left of the X axis and drives the third common signal C3 to the right of the X axis.

Thus, transfer directions of the first common signal C1, the second common signal C2, and the third common signal C3 may be determined based on positions at which the DQS module 120 and the CLKGEN module 130 are disposed, with respect to the DQ module 110. As illustrated in FIG. 5, six types of routing cells may be provided, and the interface functional block 100 may be formed by combining routing cells, based on arrangement positions of the DQ module 110, the DQS module 120, and the CLKGEN module 130.

FIGS. 6A to 6D each illustrate an example combination structure between the DQ module and the routing cells A to D for the DQ module of FIG. 5. FIGS. 7A and 7B illustrate a coupling structure between the DQS module and the routing cells E and F for the DQS module of FIG. 5. In these drawings, an arrow illustrated in routing cells represents a routing line and a direction of a signal transferred to the routing line.

Figure 6A:
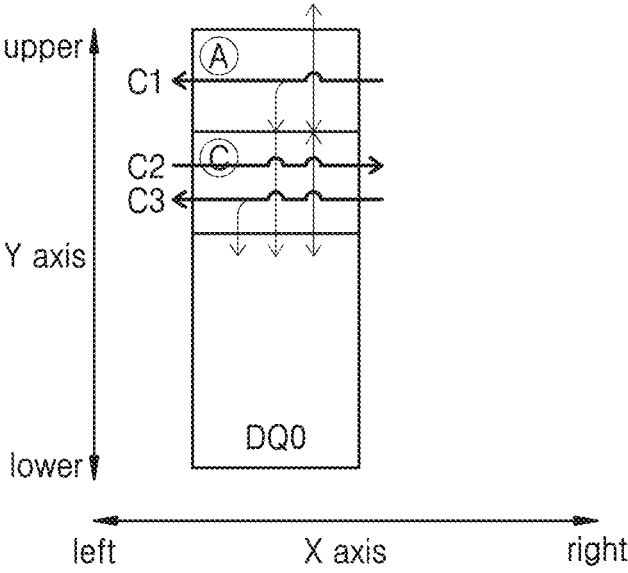
FIGS. 6A, 6B, 6C and 6D illustrate respective examples of connections between a data I/O module and routing cells, according to an embodiment.
Figure 6B:
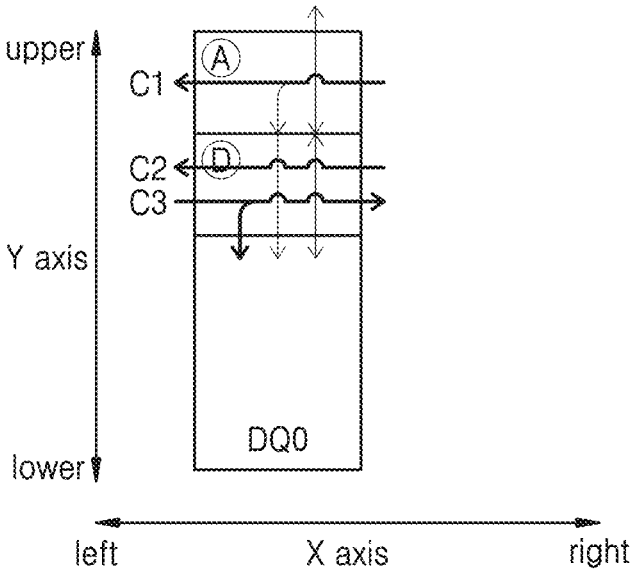
Figure 6C:
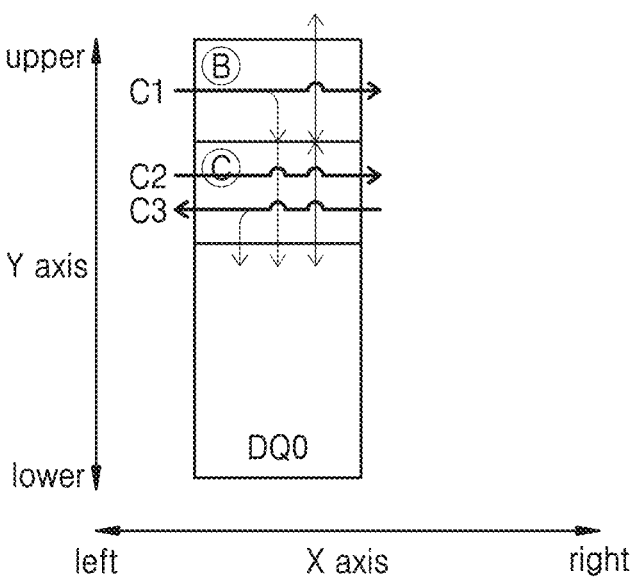

First, referring to FIGS. 6A to 6D, a combination of the routing cells A to D for DQ and the DQ module 110 may include four cases where the DQ module 110 is coupled to a combination of the routing cells A and C, a combination of the routing cells A and D, a combination of the routing cells B and C, and a combination of the routing cells B and D. FIG. 6A illustrates a combined DQ module where the routing cells C and A are sequentially disposed along the Y axis at the X axis coordinate of the DQ module 110 ("DQ0" at the lower portion of the circuit structure, routing cells C and B sequentially above DQ module 110 along the Y axis and occupying the corresponding X axis coordinate range of DQ module 110) because the first common signal C1 and the third common signal C3 are transferred from the right of the X axis to the left of the X axis, in a case where both the DQS module 120 and the CLKGEN module 130 are disposed at the right of the X axis with respect to the DQ module 110. FIG. 6B illustrates a combined DQ module where the routing cells D and A are sequentially disposed along the Y axis at the X axis coordinate of the DQ module 110 because the first common signal C1 is transferred from the right of the X axis to the left of the X axis and the third common signal C3 is transferred from the left of the X axis to the right of the X axis, in a case where the DQS module 120 is disposed at the right of the X axis and the CLKGEN module 130 is disposed at the left of the X axis with respect to the DQ module 110. FIG. 6C illustrates a combined DQ module where the routing cells C and B are sequentially disposed along the Y axis at the X axis coordinate of the DQ module 110 because the first common signal C1 and the second common signal C2 are transferred from the left of the X axis to the right of the X axis and the third common signal C3 is transferred from the right of the X axis to the left of the X axis, in a case where the DQS module 120 is disposed at the left of the X axis and the CLKGEN module 130 is disposed at the right of the X axis with respect to the DQ module 110.

Figure 6D:
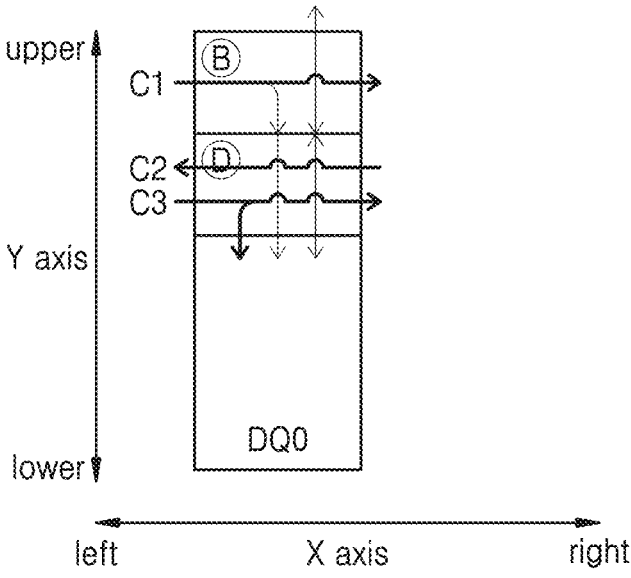
Figure 7A:
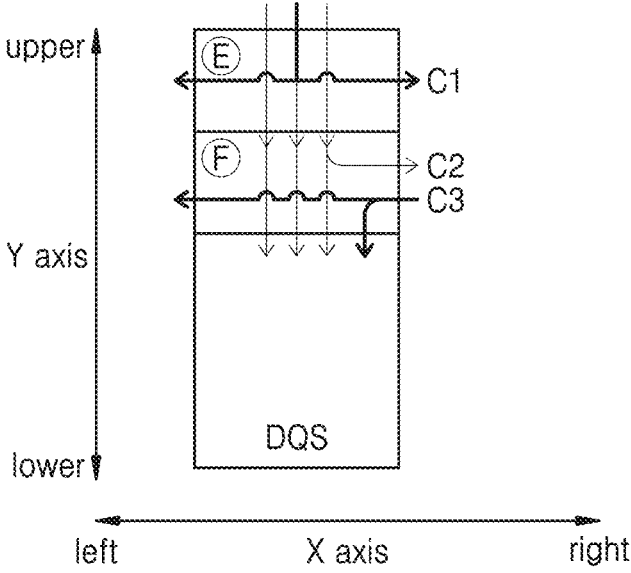
FIGS. 7A and 7B illustrate examples of connections between a strobe signal I/O module and routing cells, according to an embodiment.
Figure 7B:
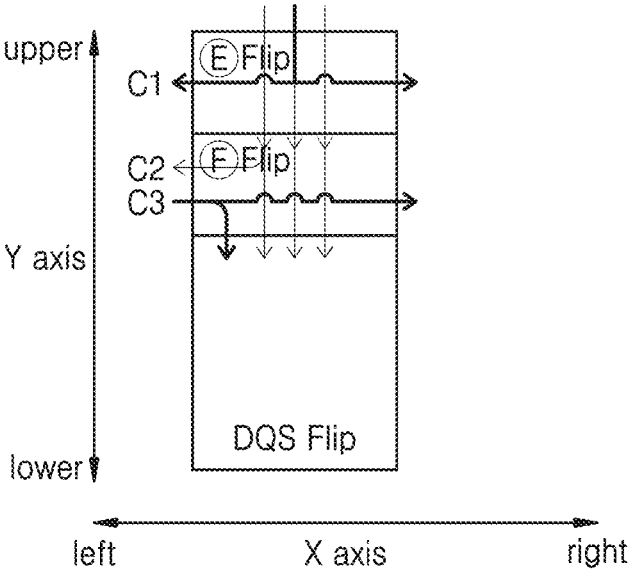

FIG. 6D illustrates a combined DQ module where the routing cells D and B are sequentially disposed along the Y axis at the X axis coordinate of the DQ module 110 because the first common signal C1 and the third common signal C3 are transferred from the left of the X axis to the right of the X axis and the second common signal C2 is transferred from the right of the X axis to the left of the X axis, in a case where both the DQS module 120 and the CLKGEN module 130 are disposed at the left of the X axis with respect to the DQ module 110.

Hence, transfer directions of the first common signal C1, the second common signal C2, and the third common signal C3 may be determined based on positions of the DQS module 120 and the CLKGEN module 130 with respect to the DQ module 110, and thus, as illustrated in FIGS. 6A to 6D, four types of combined DQ modules may be configured.

Referring to FIGS. 7A and 7B, a combination of the routing cells E and F for DQS and the DQS module 120 may include two cases. FIG. 7A illustrates a combined DQS module where the routing cells F and E are sequentially arranged along the Y axis from the DQS module 120 in a case where the CLKGEN module 130 is disposed at the right of the X axis from the DQS module 120. FIG. 7B illustrates a combined DQS module where the routing cells F and E are flipped and the flipped routing cells F and E are sequentially arranged along the Y axis from the flipped DQS module 120 in a case where the CLKGEN module 130 is disposed at the left of the X axis with respect to the DQS module 120. Thus, two combined DQS modules illustrated in FIGS. 7A and 7B may be implemented based on a position of the CLKGEN module 130 with respect to the DQS module 120.

Figure 8A:
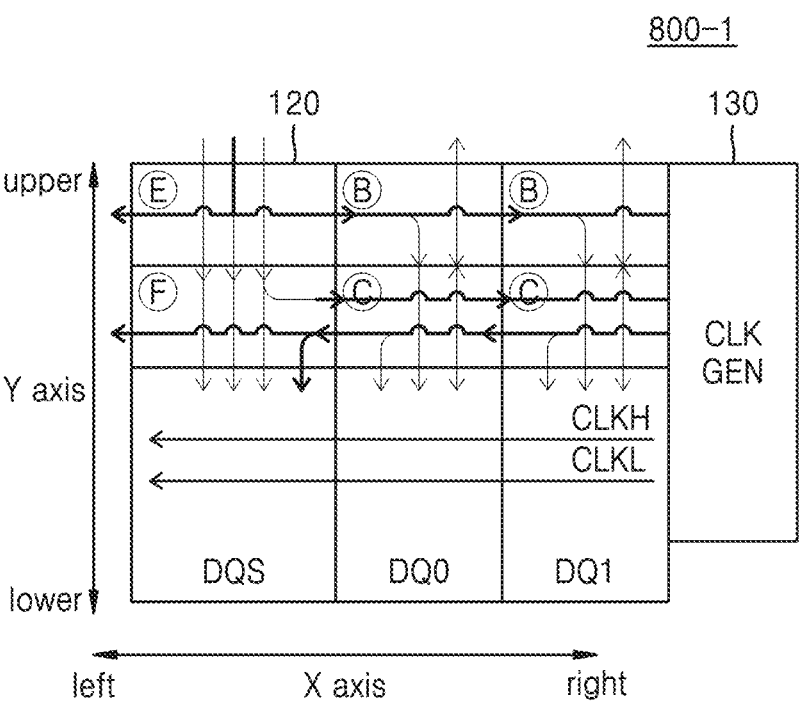
FIGS. 8A and 8B illustrate interface functional blocks including two data lanes, according to an embodiment.
Figure 8B:
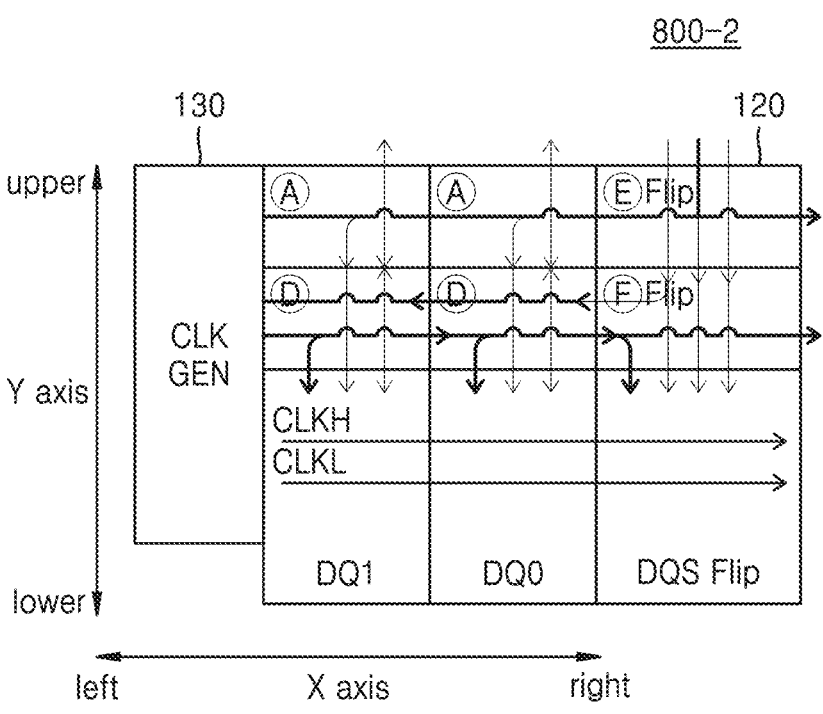

FIGS. 8A and 8B illustrate diagrams illustrating the arrangement of an interface functional block including two data lanes, according to an embodiment. A data lane may denote a signal line which transfers data between transfer/reception devices. Moreover, the number of data lanes may be determined based on the number of DQ modules included in an interface functional block.

Referring to FIG. 8A, an interface functional block 800-1 may include two DQ modules (for example, a first DQ module and a second DQ module) DQ0 and DQ1 which are sequentially arranged at the right of an X axis, a DQS module 120 which is disposed at the left of the first DQ module DQ0 and a CLKGEN module 130 which is disposed at the right of the second DQ module DQ1. Because the CLKGEN module 130 is disposed at the right of the X axis of the DQS module 120, as illustrated in FIG. 7A, a routing cell E and a routing cell F may be combined with each other in the DQS module 120. In the DQ modules DQ0 and DQ1, because the DQS module 120 is disposed at the left of the X axis and the CLKGEN module 130 is disposed at the right of the X axis, as illustrated in FIG. 6C, routing cells B and C may be combined with each other in each of the DQ modules DQ0 and DQ1. A first clock CLKL and a second clock CLKH each generated by the CLKGEN module 130 may be transferred to the DQS module 120 and the DQ modules DQ0 and DQ1 in a left direction of the X axis (but not in a right direction of the X axis).

Referring to FIG. 8B, an interface functional block 800-2 may include two DQ modules DQ0 and DQ1 which are sequentially arranged at the right of an X axis, a CLKGEN module 130 which is disposed at the left of the DQ modules DQ0 and DQ1, and a DQS module 120 which is disposed at the right of the DQ modules DQ0 and DQ1. Because the CLKGEN module 130 is disposed at the left of the DQS module 120, as illustrated in FIG. 7B, flipped routing cells E and F may be combined with each other in a flipped DQS module. In the DQ modules DQ0 and DQ1, because the DQS module 120 is disposed at the right and the CLKGEN module 130 is disposed at the left, as illustrated in FIG. 6B, routing cells A and D may be combined with each other. A first clock CLKL and a second clock CLKH each generated by the CLKGEN module 130 may be transferred to the DQS module 120 and the DQ modules DQ0 and DQ1 in only a right direction of the X axis.

Figure 9A:
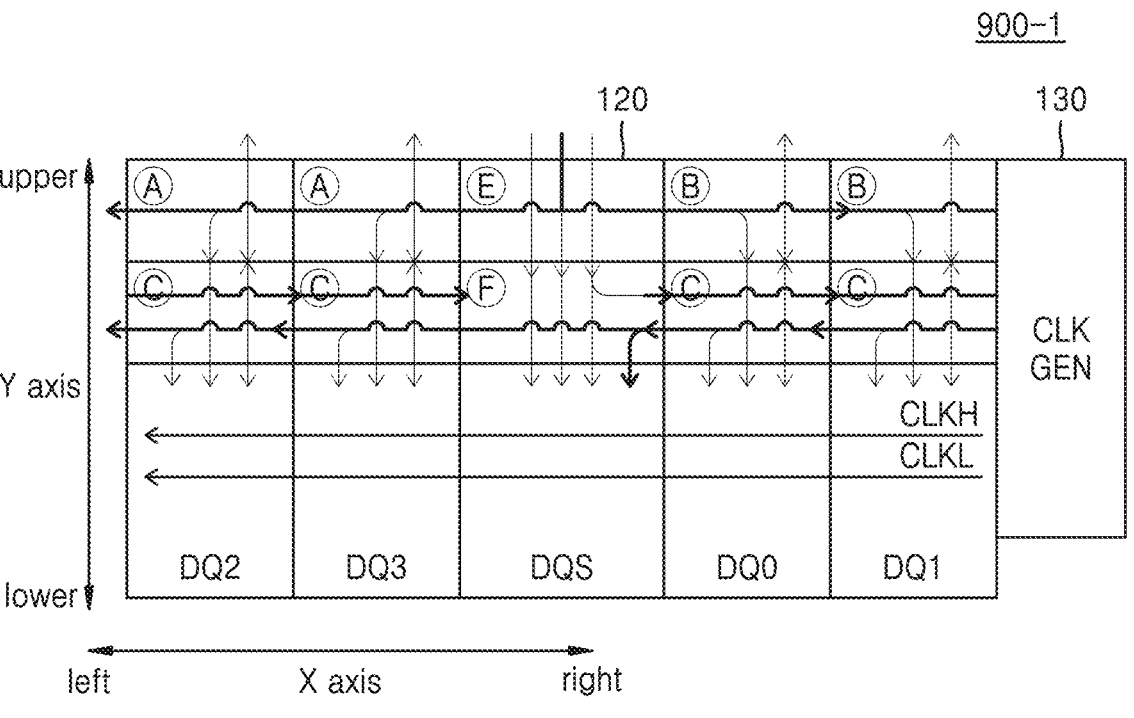
FIGS. 9A and 9B illustrate interface functional blocks including four data lanes, according to an embodiment.
Figure 9B:
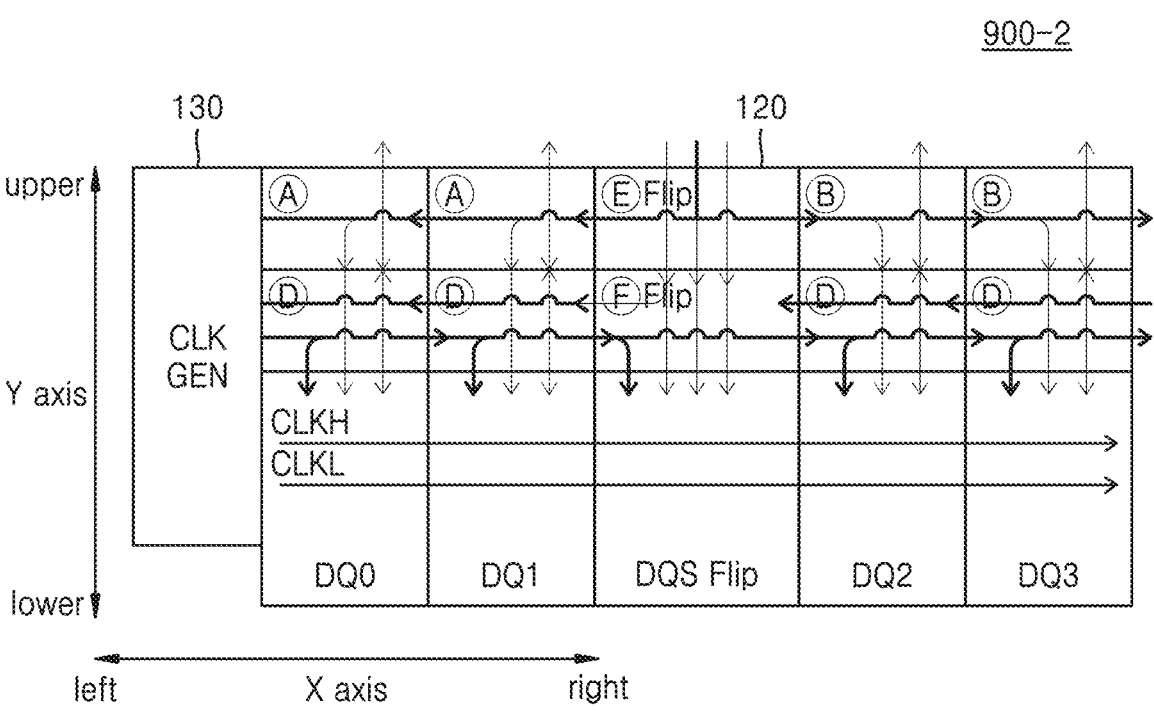

FIGS. 9A and 9B illustrate diagrams illustrating the arrangement of interface functional blocks including four data lanes, according to an embodiment.

Referring to FIG. 9A, an interface functional block 900-1 may be implemented by adding two DQ modules DQ2 and DQ3 to the left of the DQS module 120 of the interface functional block 800-1 of FIG. 8A. Both the DQS module 120 and a CLKGEN module 130 may be disposed at the right of an X axis from the added DQ modules DQ2 and DQ3, and thus, as illustrated in FIG. 6A, a routing cell A and a routing cell C may be sorted and combined in each of the DQ module DQ2 and the DQ module DQ3.

Referring to FIG. 9B, an interface functional block 900-2 may be implemented by adding two DQ modules DQ2 and DQ3 to the right of the DQS module 120 of the interface functional block 800-2 of FIG. 8B. Both the DQS module 120 and a CLKGEN module 130 may be disposed at the right of an X axis from the added DQ modules DQ2 and DQ3, and thus, as illustrated in FIG. 6D, a routing cell B and a routing cell D may be sorted and combined in each of the DQ module DQ2 and the DQ module DQ3.

Figure 10A:
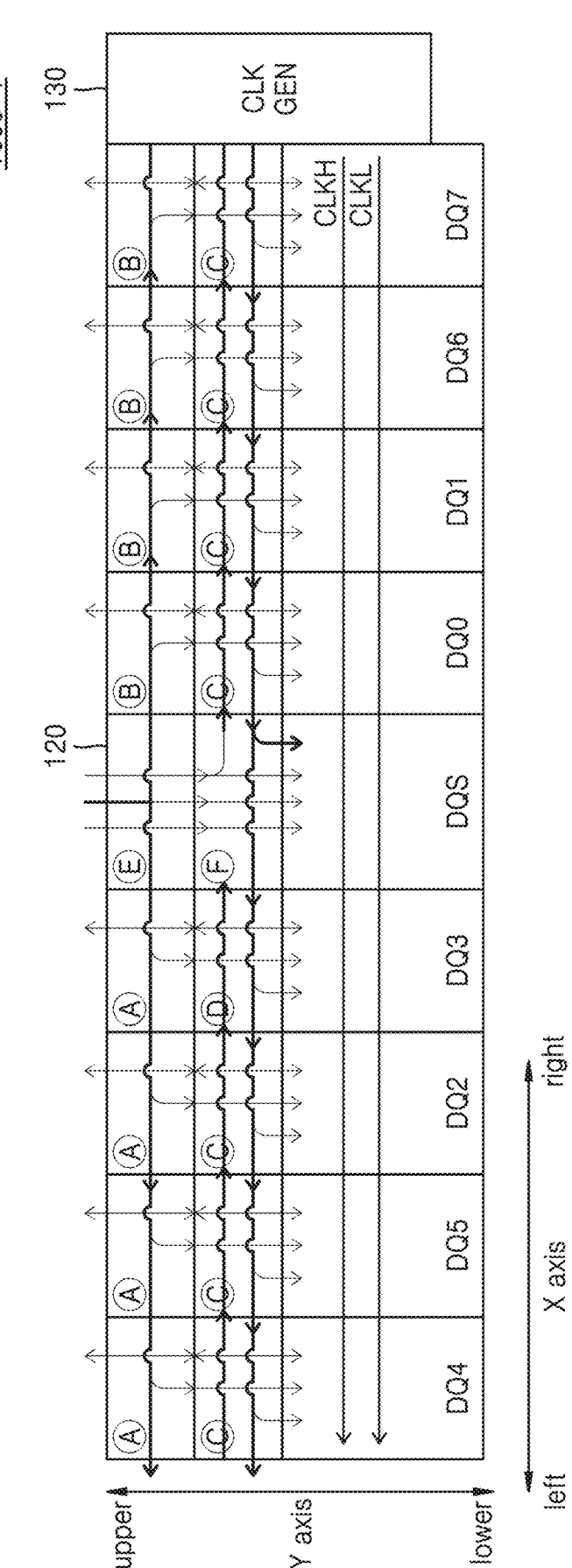
FIGS. 10A and 10B illustrate interface functional blocks including eight data lanes, according to an embodiment.
Figure 10B:
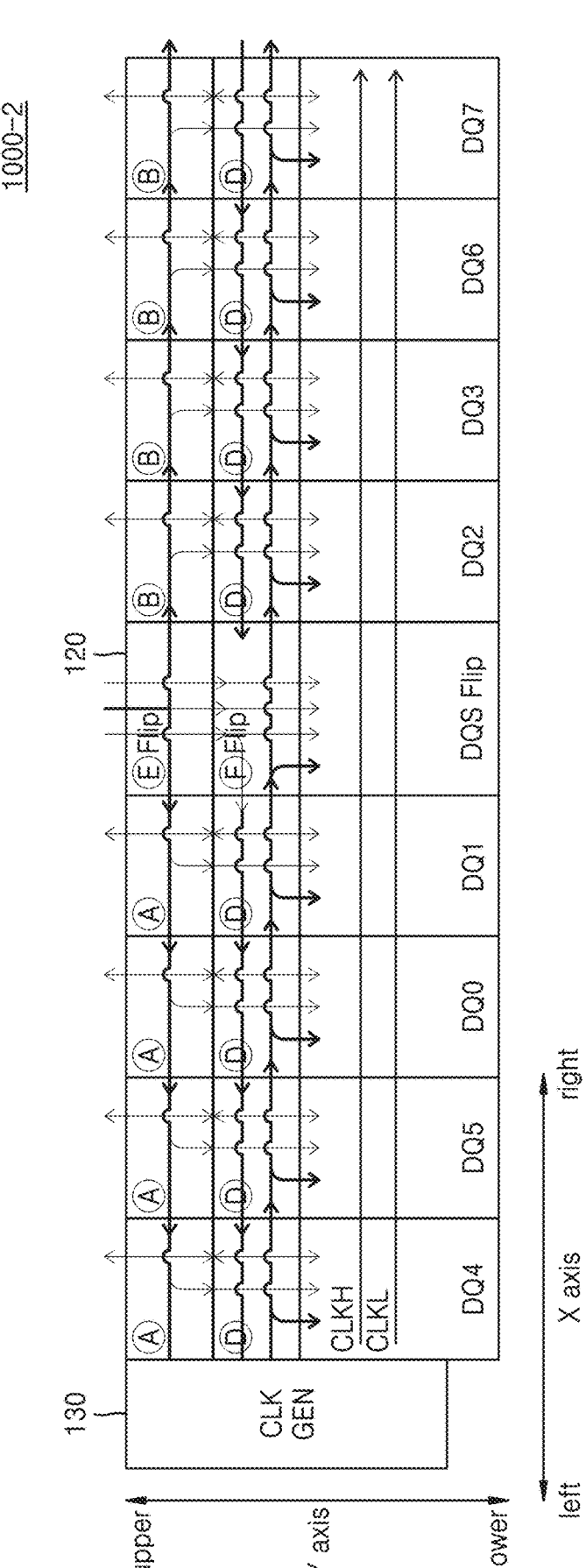

FIGS. 10A and 10B illustrate diagrams illustrating the arrangement of interface functional blocks including eight data lanes, according to an embodiment.

Referring to FIG. 10A, an interface functional block 1000-1 may further include two DQ modules DQ4 and DQ5 which are added to the left of the DQ module DQ2 of the interface functional block 900-1 of FIG. 9A and two DQ modules DQ6 and DQ7 which are added between a CLKGEN module 130 and a DQ module DQ1. In the two DQ modules DQ4 and DQ5 added to the left of the DQ module DQ2, because both the DQS module 120 and the CLKGEN module 130 are disposed at the right of an X axis, as illustrated in FIG. 6A, a routing cell A and a routing cell C may be sorted and combined with each other. Also, in the added two DQ modules DQ6 and DQ7, because the DQS module 120 is disposed at the left of the X axis and the CLKGEN module 130 is disposed at the right of the X axis, as illustrated in FIG. 6C, a routing cell B and the routing cell C may be sorted and combined with each other.

Referring to FIG. 10B, an interface functional block 1000-2 may further include two DQ modules DQ4 and DQ5 which are added between the DQ module DQ0 and the CLKGEN module 130 of the interface functional block 900-2 of FIG. 9B and two DQ modules DQ6 and DQ7 which are added to the right of the DQ module DQ3. A routing cell A and a routing cell D, as illustrated in FIG. 6B, may be combined with each other and may be disposed in the two DQ modules DQ4 and DQ5 added between the DQ module DQ0 and the CLKGEN module 130. A routing cell B and the routing cell D, as illustrated in FIG. 6D, may be combined with each other and may be disposed in the two DQ modules DQ6 and DQ7 added to the right of the DQ module DQ3.

Each of the interface functional blocks of FIGS. 9A to 10B may include four or more even DQ modules arranged along the X axis and a DQS module 120 which is disposed at a center of the DQ modules. Also, each interface functional block may include the CLKGEN module 130 which is disposed at the leftmost or rightmost of a corresponding interface functional block and may transfer a clock in only one direction of the X axis.

Figure 11:
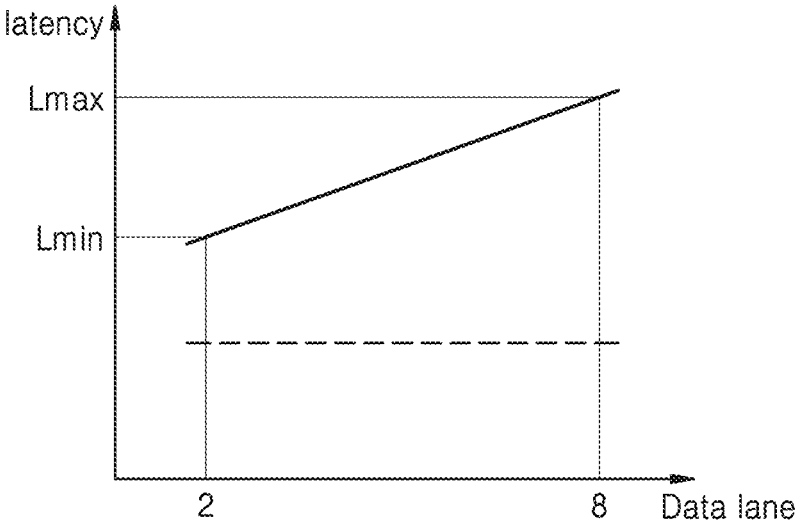
FIG. 11 is a graph showing latency of signals with respect to the number of data lanes of interface functional blocks, according to an embodiment.

FIG. 11 is a graph showing latency of signals with respect to the number of data lanes of interface functional blocks according to an embodiment.

Referring to FIG. 11, an X axis represents the number of data lanes (i.e., the number of DQ modules) included in an interface functional block, and a Y axis represents latency of a signal. A dotted line represents latency of a dedicated signal transferred to a DQ module or a DQS module, and a solid line represents latency of a first common signal or a second common signal. Latency of a dedicated signal is intactly maintained even when the number of data lanes of an interface functional block increases, or as the number of data lanes increases, latency of the first or second common signal may increase.

Generally, after an interface functional block is manufactured, layout information and timing information may be extracted. Because an interface functional block using routing cells according to an embodiment uses routing cells previously designed for routing between modules, the layout information may be extracted without a routing process for a connection between signal lines. Also, as illustrated in FIG. 11, an interface functional block using routing cells according to an embodiment may extract timing information about signals of an interface functional block including a middle data lane by performing interpolation of minimum latency Lmin of a first or second common signal of a minimum data lane and maximum latency Lmax of a first or second common signal of a maximum data lane, even without direct routing. Accordingly, an interface functional block may be implemented by using compiled layout information and timing information based on a data lane configuration with a routing cell.

FIG. 12 is a design flowchart of an interface functional block, according to an embodiment.

Referring to FIGS. 12 and 1, the DQ module 110, the DQS module 120, and the CLKGEN module 130 may be first prepared in operation S121. Signals between the DQ module 110, the DQS module 120, and the CLKGEN module 130 may be classified, four routing cells for DQ illustrated in FIG. 5 may be prepared based on a classification result and positions at which the DQ module 110 and the DQS module 120 are capable of being disposed, and two routing cells for DQS illustrated in FIG. 5 may be prepared based on the classification result and positions at which the DQS module 120 and the CLKGEN module 130 are capable of being disposed, in operation S123. Combined DQ modules where the DQ module 110 and routing cells for DQ are combined as described above with reference to FIGS. 6A to 6D and combined DQS modules where a DQS module and routing cells for DQ are combined as described above with reference to FIGS. 7A and 7B may be prepared in operation S125. The number of DQ modules may be determined based on the number of data lanes of the interface functional block 100, a position of the DQS module may be determined based on the DQ module, and a position of the CLKGEN module may be determined based on the DQS module in operation S127. The combined DQ modules and the combined DQS modules may be disposed along a first axis, based on the number of determined DQ modules 110 in operation S129. The CLK-GEN module may be disposed at the most left or right along the first axis, and thus, the CLKGEN module may be disposed so that a clock generated by the CLKGEN module is transferred in a left or right direction, respectively, of the first axis toward the disposed DQS modules and DQ modules disposed at the first axis (operation S131). After combined DQ modules, a combined DQS module, and a CLK-GEN module are placed, a graphics design system (GDS) file including layout information may be generated in operation S133. After the combined DQ modules, the combined DQS module, and the CLKGEN module are placed, timing information may be checked by performing static timing analysis (STA) before generating the GDS file in operation S133.

The number of data lanes (or the number of DQ modules) may be determined based on a data bandwidth which is to be transferred as described above and previously designed routing cells may be selectively combined based on arrangement positions of a DQS module and a CLKGEN module with respect to a DQ module, and thus, an interface functional block may be easily manufactured by using prepared routing cells despite the number of data lanes being changed, thereby reducing a development time.

A design process of FIG. 12 may be executed by a computer system which performs an electronic design automation (EDA) program using a database including a DQ module, a DQS module, a CLKGEN module, routing cells for DQ, routing cells for DQS, combined DQ modules, a combined DQS module, and other standard cells.

Figure 13:
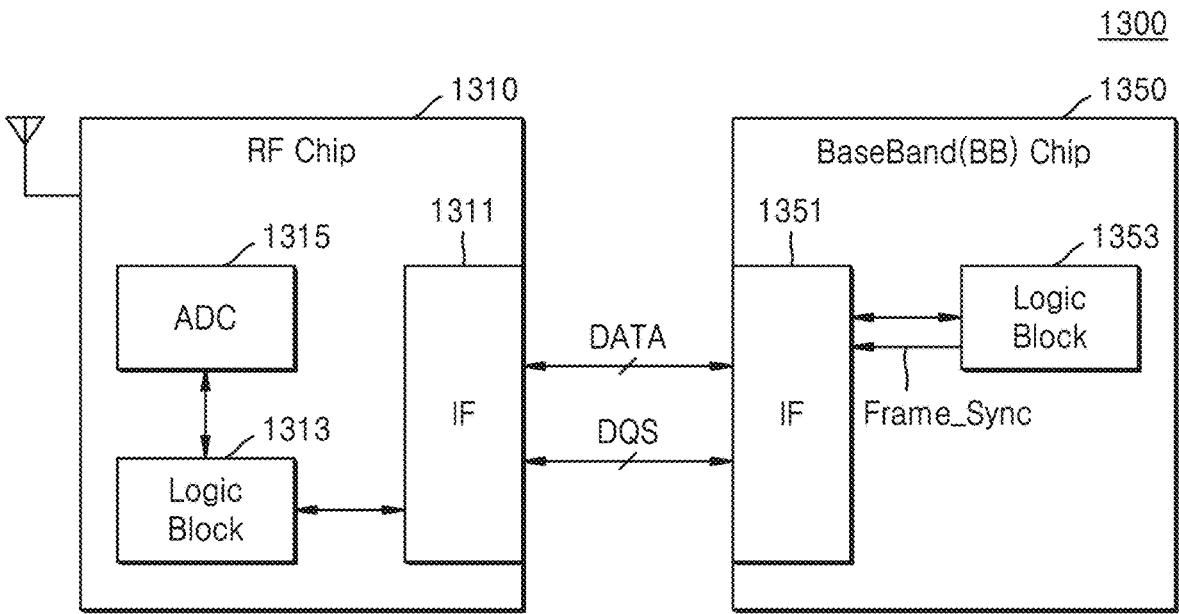
FIG. 13 is a block diagram of a semiconductor system including an interface functional block, according to an embodiment.

FIG. 13 is a block diagram of a semiconductor system 1300 including an interface functional block, according to an embodiment.

Referring to FIG. 13, the semiconductor system 1300 may be a communication system which includes a radio frequency (RF) chip 1310 and a modem chip (or a baseband (BB) chip) 1350. The RF chip 1310 may include an interface functional block 1311, a logic block 1313, and an analog-to-digital converter (ADC) 1315. The RF chip 1310 may receive a high frequency signal through an antenna and may convert the high frequency signal into a low frequency signal, and then, may generate digital data by using the ADC 1315. The logic block 1313 may configure, by frame units, the digital data generated by the ADC 1315 and may transfer data included in a frame to the interface functional block 1131. The interface functional block 1131 may be one type of the interface functional blocks described above with reference to FIGS. 1 to 10B, serialize data transferred in parallel from the logic block 1313, and transfer serialized data to the modem chip 1350.

The modem chip 1350 may include an interface functional block 1351 and a logic block 1353. The interface functional block 1351 may be one type of the interface functional blocks described above with reference to FIGS. 8A to 10B and may receive and deserialize a serialized digital data signal transferred by the RF chip 1310. The logic block 1353 may receive deserialized data from the interface functional block 1351 and may process data by frame units.

The interface functional blocks 1131 and 1351 respectively included in the RF chip 1310 and the modem chip 1350 may each be configured as one of the interface functional blocks of FIGS. 1 to 10B according to embodiments, based on the number of data lanes. The number of data lanes may be determined based on a data bandwidth needed for the communication system 1300, and in the interface functional block according to an embodiment, when the arrangement of modules included in the interface functional block is determined and thus previously designed routing cells are combined and disposed, routing of signals may be completed, and accordingly, redesigning for routing may not be needed, thereby shortening a manufacturing time while maintaining an optimized size. Also, according to the embodiments, in implementing a layout of a semiconductor circuit, because it is unnecessary to perform place & route (PnR) from an initial stage, routing cells including various types of routing lines may be pre-defined, and IP such as high speed interface IP may be manufactured through only the arrangement of pre-defined routing cells, thereby enhancing manufacturing efficiency.

Furthermore, in the embodiments, a DQ module or a DQS module being combined with a routing cell may denote that at least one routing cell selected from among a plurality of routing cells defined as various types is combined with the DQ module or the DQS module through hardwiring. Also, in the embodiments, a case where routing cells according to embodiments are applied to an RF chip and a modem chip is illustrated, but embodiments may be applied to physical layers of various types of semiconductor devices (for example, semiconductor devices such as a memory device, a memory controller, an application processor, and a system on a chip) which transfer or receive at least one of data, a strobe signal, and a clock signal to or from the external components, or internally transfer at least one of data, a strobe signal, and a clock signal.

Also, in a method of manufacturing an integrated circuit including standard cells, a routing cell according to embodiments may be included in a cell library used in the method of manufacturing the integrated circuit. For example, logic synthesis may be performed with reference to the cell library from resistor transistor logic (RTL) data written in very high speed integrated circuit (HVSIC) hardware description language (VHDL) and hardware description language (HDL) such as Verilog and netlist data may be generated, or standard cells used in a netlist may be placed with reference to the cell library, or a design such as connecting the placed standard cells with one another may be performed, and the cell library may include various types of routing cells described in an embodiment.

Hereinabove, exemplary embodiments have been described in the drawings and the specification. Embodiments have been described by using the terms described herein, but this has been merely used for describing the embodiments and not for limiting a meaning or limiting the scope of the inventive concept defined in the following claims. Therefore, it may be understood by those of ordinary skill in the art that various modifications and other equivalent embodiments may be implemented in accordance with the inventive concept. Accordingly, the spirit and scope of the inventive concept may be defined based on the following claims.

While the inventive concept has been particularly shown and described with reference to embodiments thereof, it will be understood that various changes in form and details may be made therein without departing from the spirit and scope of the following claims.

What is claimed is:

1. An interface functional block comprising:
a first data input/output (I/O) circuit and a second data I/O circuit, which are arranged sequentially along a first axis;
a strobe signal I/O circuit disposed at a left side of the first axis from the first data I/O circuit;
a clock generator circuit disposed at a right side of the first axis from the second data I/O circuit;
a first type routing cell and a second type routing cell, which are arranged sequentially along a second axis perpendicular to the first axis at a first axis coordinate of the strobe signal I/O circuit;

a third type routing cell and a fourth type routing cell, which are arranged sequentially along the second axis at a first axis coordinate of the first data I/O circuit; and
a further third type routing cell and a further fourth type routing cell, which are arranged sequentially along the second axis at a first axis coordinate of the second data I/O circuit,
wherein a clock generated by the clock generator circuit is transferred in a left direction of the first axis toward the first and second data I/O circuits and the strobe signal I/O circuit.

2. The interface functional block of claim 1, wherein the clock comprises:
a first clock having a data transfer frequency; and
a second clock having a frequency which is lower than the data transfer frequency.

3. The interface functional block of claim 2, wherein the first type routing cell comprises:
a plurality of routing lines extending along the second axis and including a routing line for a strobe signal I/O dedicated signal, a routing line for a first common signal commonly applied to the first and second data I/O circuits, the strobe signal I/O circuit, and the clock generator circuit, and a routing line for a second common signal transferred to the strobe signal I/O circuit and the clock generator circuit but not to the first and second I/O circuits; and
a routing line extending along the first axis and including a routing line for a third common signal transferred from the clock generator circuit, and
the second type routing cell comprises:
a plurality of routing cells corresponding to the routing lines extending along the second axis in the first type routing cell; and
a routing line configured to transfer the first common signal along the first axis.

4. The interface functional block of claim 3, wherein the third type routing cell comprises:
a plurality of routing lines extending along the second axis and including a routing line for a data I/O dedicated signal and a routing line for the first common signal; and
a plurality of routing lines extending along the first axis and including a routing line configured to transfer the second common signal to the right side of the first axis and transfer the third common signal to the left side of the first axis, and
the fourth type routing cell comprises:
a plurality of routing lines extending along the second axis and corresponding to the routing line for the first common signal and the routing line for the data I/O dedicated signal in the third type routing cell; and
a routing line configured to transfer the first common signal to the right side of the first axis.

5. The interface functional block of claim 4, further comprising:
a third data I/O circuit and a fourth data I/O circuit arranged sequentially at the left side of the first axis of the strobe signal I/O circuit; and
the third type routing cell and a fifth type routing cell, arranged sequentially along the second axis from each of the third and fourth data I/O circuits.

6. The interface functional block of claim 5, wherein the fifth type routing cell comprises:
a plurality of routing lines corresponding to the routing lines extending along the second axis in the third type routing cell; and a routing line configured to transfer the first common signal to the left side of the first axis.

7. The interface functional block of claim 6, wherein each of the fourth type routing cell and the fifth type routing cell comprises a buffer configured to transfer the first common signal, and a drive direction of the buffer of the fourth type routing cell is opposite to a drive direction of the buffer of the fifth type routing cell.

8. The interface functional block of claim 2, wherein each of the first and second data I/O circuits is configured to sort data input in parallel by using the second clock and serialize and output sorted data by using the first clock.

9. The interface functional block of claim 1, wherein each of the first and second data I/O circuits comprises a test unit configured to generate a test pattern in a test mode.

10. An interface functional block comprising:
a first data input/output (I/O) circuit and a second data I/O circuit, which are arranged sequentially along a first axis;
a strobe signal I/O circuit disposed at a right side of the first axis from the second data I/O circuit;
a clock generator circuit disposed at a left side of the first axis from the first data I/O circuit;
a first type routing cell and a second type routing cell, which are arranged sequentially along a second axis perpendicular to the first axis at a first axis coordinate of the strobe signal I/O circuit;
a third type routing cell and a fourth type routing cell, which are arranged sequentially along the second axis at a first axis coordinate of the first data I/O circuit; and
a further third type routing cell and a further fourth type routing cell, which are arranged sequentially along the second axis at a first axis coordinate of the second data I/O circuit,
wherein a clock generated by the clock generator circuit is transferred in a right direction of the first axis toward the first and second data I/O circuits and the strobe signal I/O circuit.

11. The interface functional block of claim 10, wherein the clock comprises:
a first clock having a data transfer frequency; and
a second clock having a frequency which is lower than the data transfer frequency, and
each of the first and second data I/O circuits is configured to sort data input in parallel by using the second clock and serialize and output the sorted data by using the first clock.

12. The interface functional block of claim 10, wherein the first type routing cell comprises:
a plurality of routing lines extending along the second axis and including a routing line for a strobe signal I/O dedicated signal, a routing line for a first common signal commonly applied to the first and second data I/O circuits, the strobe signal I/O circuit, and the clock generator circuit, and a routing line for a second common signal transferred to only the strobe signal I/O circuit and the clock generator circuit; and
a routing line extending along the first axis and including a routing line for a third common signal transferred from the clock generator circuit, and
the second type routing cell comprises:
a plurality of routing lines corresponding to the routing lines extending along the second axis in the first type routing cell; and
a routing line configured to transfer the first common signal along the first axis.

13. The interface functional block of claim 12, wherein the third type routing cell comprises:
a plurality of routing lines extending along the second axis and including a routing line for a data I/O dedicated signal and a routing line for the first common signal; and
a plurality of routing lines extending along the first axis and including a routing line for the second common signal and a routing line for the third common signal, and
the fourth type routing cell comprises:
a plurality of routing lines extending along the second axis and corresponding to the routing line for the first common signal and the routing line for the data I/O dedicated signal in the third type routing cell; and
a routing line configured to transfer the first common signal to the right side of the first axis.

14. The interface functional block of claim 13, further comprising:
a third data I/O circuit and a fourth data I/O circuit, which are arranged sequentially at the right side of the first axis of the strobe signal I/O circuit; and
the third type routing cell and a fifth type routing cell, which are arranged sequentially along the second axis from each of the third and fourth data I/O circuits.

15. The interface functional block of claim 14, wherein the fifth type routing cell comprises:
a plurality of routing lines corresponding to the routing lines extending along the second axis in the third type routing cell; and
a routing line configured to transfer the first common signal to the right side of the first axis.

16. The interface functional block of claim 15, wherein each of the fourth type routing cell and the fifth type routing cell comprises a buffer configured to transfer the first common signal, and a drive direction of the buffer of the fourth type routing cell is opposite to a drive direction of the buffer of the fifth type routing cell.

17. The interface functional block of claim 10, wherein each of the first and second data I/O circuits comprises a test unit configured to generate a test pattern in a test mode.

18. A design method of an interface functional block, the design method comprising:
based on a classification result of signal lines between a data input/output (I/O) circuit, a strobe signal I/O circuit, and a clock generator circuit, generating routing cells for the data I/O circuit, which are based on arrangement positions of the data I/O circuit and the strobe signal I/O circuit, and routing cells for the strobe signal I/O circuit, which are based on arrangement positions of the strobe signal I/O circuit and the clock generator circuit;
generating combined data I/O circuits, in which the data I/O circuit is combined with the routing cells for the data I/O circuit, and combined strobe signal I/O circuits, in which the strobe signal I/O circuit is combined with the routing cells for the strobe signal I/O circuit;
placing two or more of the combined data I/O circuits and the combined strobe signal I/O circuits along a first axis; and
placing the clock generator circuit along the first axis so that a clock generated by the clock generator circuit is transferred in a left or right direction of the first axis toward the combined data I/O circuits and the combined strobe signal I/O circuits.

19. The design method of claim 18, wherein each of the routing cells for the data I/O circuit and the routing cells for the strobe signal I/O circuit comprises:

a routing line for a dedicated signal transferred to the data I/O circuit and the strobe signal I/O circuit but not to the clock generator circuit; and a routing line for a first common signal transferred in common to the data I/O circuit, the strobe signal I/O circuit, and the clock generator circuit.

20. The design method of claim 19, wherein the clock comprises:

a first clock having a data transfer frequency; and a second clock having a frequency which is lower than the data transfer frequency, and each of the combined data I/O circuits is configured to sort data input in parallel through the routing line for the dedicated signal using the second clock and serialize and output the sorted data using the first clock.

\*   \*   \*   \*   \*